Dec. 23, 1969    W. T. GABLE, JR., ET AL    3,485,019
COTTON HARVESTER WITH PNEUMATIC GREEN BOLL SEPARATOR
Filed July 1, 1968    2 Sheets-Sheet 1

Inventors:
Charles G. Barfield
Wyatt T. Gable, Jr.
By John J. Kowalik
Atty.

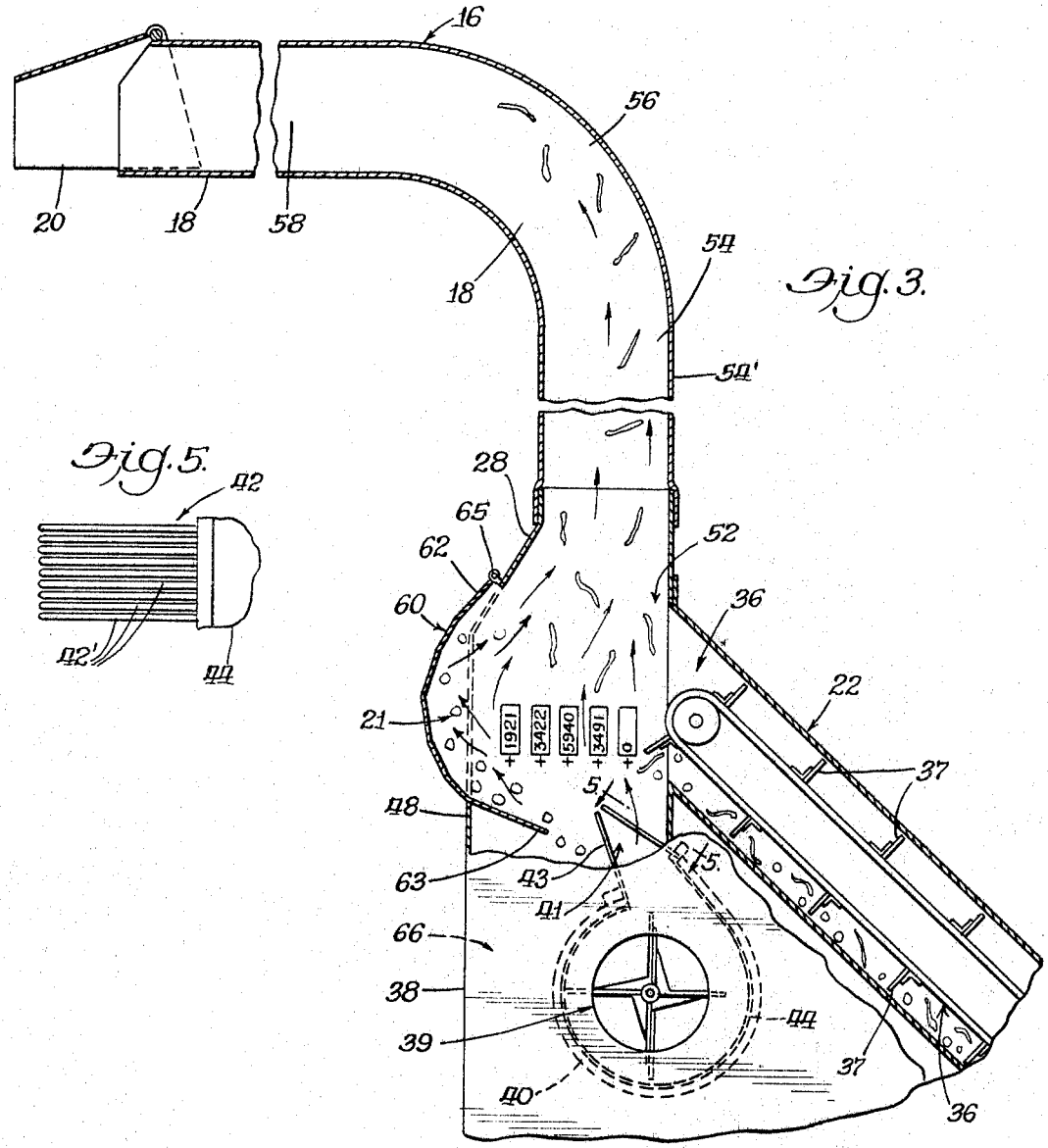
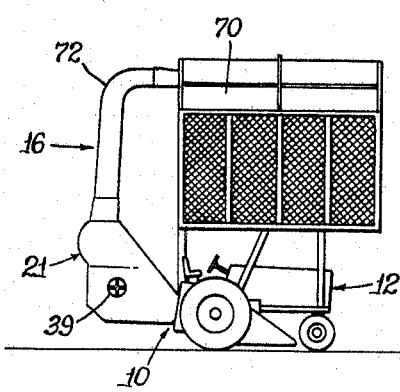

United States Patent Office 3,485,019
Patented Dec. 23, 1969

3,485,019
COTTON HARVESTER WITH PNEUMATIC GREEN BOLL SEPARATOR
Wyatt T. Gable, Jr., Memphis, Tenn., and Charles G. Barfield, West Memphis, Tenn., assignors to International Harvester Company, Chicago, Ill., a corporation of Delaware
Filed July 1, 1968, Ser. No. 745,077
Int. Cl. A01d 45/20
U.S. Cl. 56—30     7 Claims

ABSTRACT OF THE DISCLOSURE

Cotton stripper with mechanical conveyor leading to an air stream conduit, the conduit having a bellied-out portion in which the air flows at lesser velocity, and into which the heavier green bolls are thrown by the conveyor, enabling the green bolls to drop out of the air stream and the lint cotton to be carried by the air stream to a receptacle.

GENERAL FIELD OF THE INVENTION

The invention relates to that type of cotton harvesting performed by cotton strippers, in which all of the cotton, both lint cotton and green bolls are stripped from the plants. The lint cotton is to be carried to a receptacle, and it is desired that the green bolls be separated from the lint cotton and not be delivered to the receptacle. The green bolls are treated in a separate program and afforded an opportunity for ripening after which they are again treated as ripe cotton.

In conveying the cotton after being stripped from the plants, various devices and methods have been used heretofore for separating the green bolls from the lint cotton. The cotton is carried to the receptacle by an air stream, and various devices and methods have been utilized heretofore for conveying the green bolls, or enabling them to drop, out of the air stream so as not to be carried to the receptacle with the lint cotton.

OBJECTS OF THE PRESENT INVENTION

A general and broad object of the present invention is to provide a novel construction applicable to cotton harvesting of the foregoing general character which is capable of more effectively separating the green bolls from the lint cotton.

A more specific object is to provide a construction of the foregoing general character having a conduit, means for producing an air stream in the conduit, and mechanical conveyor means for conveying the stripped cotton to the air stream, in which the conduit is provided with a novel structure including a concave portion so related to the conveyor that the heavier green bolls conveyed by the conveyor are thrown across a stratified air stream and directed into the concave portion, the bulk of the lighter weight lint cotton being carried by the main air stream to the intended receptacle therefor and residual lint cotton which has crossed the main stream by being commingled with the green bolls being carried out of the pocket by a scavenging stream of air into the main air stream.

A still more specific object is to provide a cotton stripper and conduit construction of the foregoing general character in which the concave portion is of curved shape and extends downwardly into proximity with the source of the air stream to such an extent that the lower velocity air in the concave portion extends well downwardly and beyond the effectiveness of the main portion of the air stream so as to prevent again carrying the heavier green bolls upwardly in the air stream.

DESCRIPTION OF A PREFERRED EMBODIMENT OF THE INVENTION

FIGURE 3 is a view similar to FIGURE 2 but showing a different form of mechanical conveyor means from that shown in FIGURE 1, and to which the invention is also applicable;

FIGURE 4 is a small scale view showing a cotton stripper having a basket overhead, and incorporating the features of the invention; and FIGURE 5 is a plan view of that portion of the upper air directing grate, with parts broken away, taken substantially on the line 5—5 of FIGURE 4.

Figure 1:
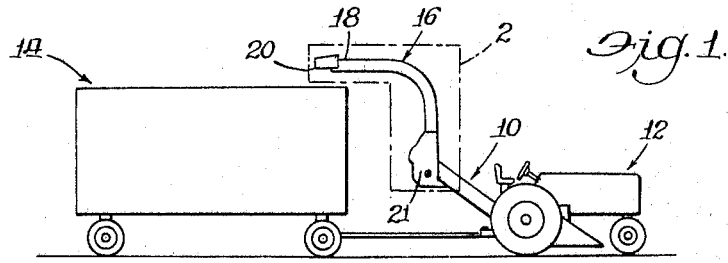
FIGURE 1 is a small scale semi-diagrammatic view of a cotton stripper embodying the features of the present invention, and related implements.

Referring now in detail to the accompanying drawings, attention is directed first to FIGURE 1 showing a cotton stripper 10 of known general type which is utilized for stripping all of the cotton from the cotton plants, including the lint cotton as well as all of the green bolls. The stripped is drawn by a suitable prime mover 12 such as a tractor which draws a trailer 14 thus providing a receptacle for the cotton, particularly the lint cotton, from the stripper. The stripper 10 is provided with delivery means indicated generally at 16 including a pneumatic conduit 18 having a terminal end or nozzle 20 directed into the receptacle 14. The pneumatic conveyor conduit 16 is in general is of known character, but in the present instance is provided with a specific construction of separation chamber 21 according to the features of the present invention as will be described in detail hereinbelow.

Figure 2:
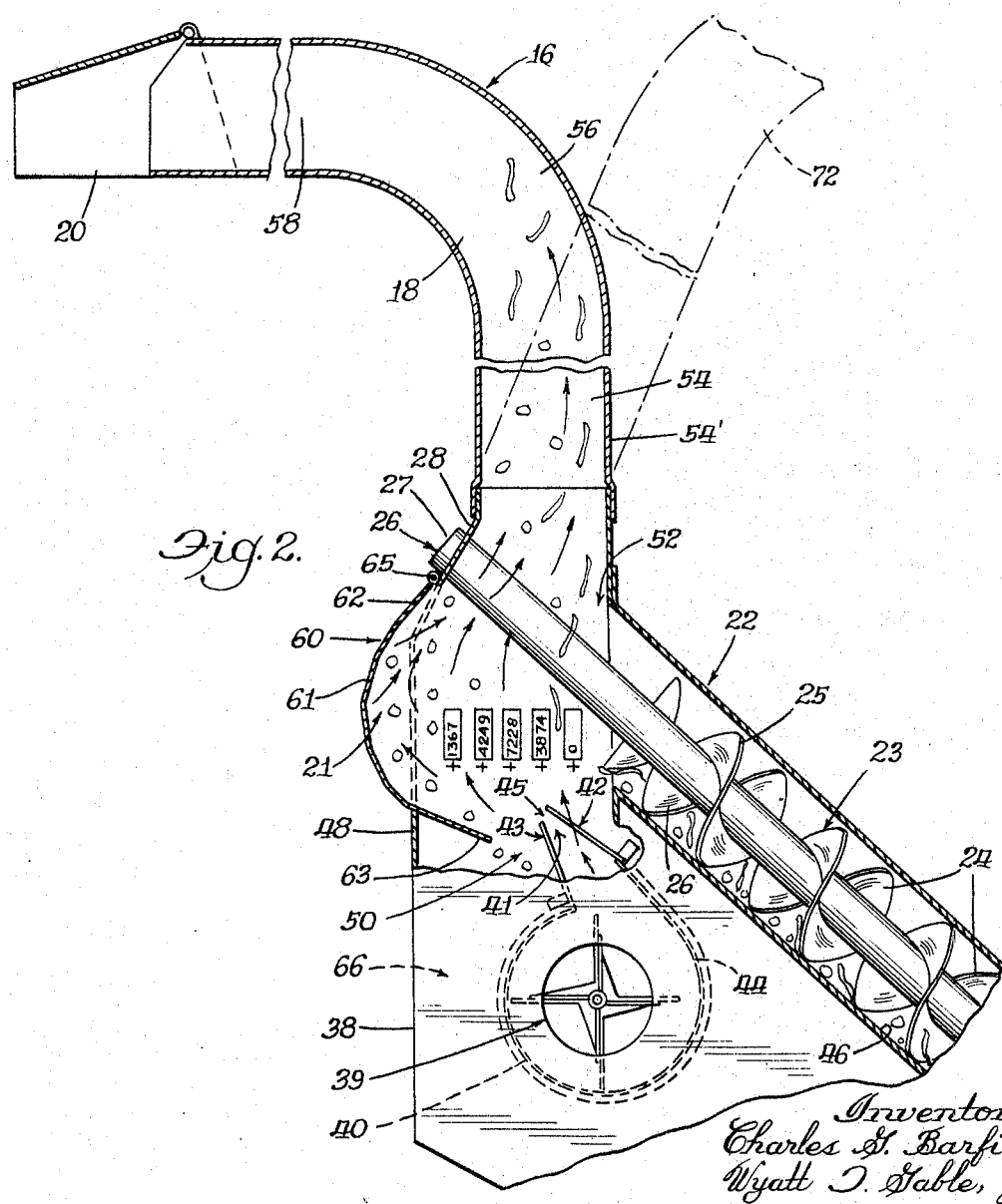
FIGURE 2 is a large scale view, mostly in vertical section, of that portion of FIGURE 1 enclosed in dot-dash lines and indicated at 2, and oriented according to FIGURE 1.

Attention is next directed to FIGURE 2 which is a large scale vertical view, mostly in section, of that portion of FIGURE 1 enclosed in the dot-dash lines indicated at 2, and oriented according to FIGURE 1. This figure indicates the stripper 10 and shows the pneumatic conveying conduit 18 which is a component of the pneumatic delivery means indicated generally at 16. The cotton stripper 10 is operative for stripping all of the cotton from the plants including both the lint cotton and the green bolls and conveying them rearwardly by suitable means which in the present instance includes a mechanical conveyor 22, in this modification in the form of auger means 23 including two augers 24 and 25 each having a central shaft 26 with its terminal end 27 journalled in a wall element 28 of the structure constituting the pneumatic delivery means 16. It should be observed that the conveyor means 22 is arranged at an upwardly inclined angle for throwing the cotton in that direction into the conduit means.

The invention is applicable also to an arrangement in which the mechanical conveyor means 22 is in the form of a compartmented chain conveyor as shown in FIGURE 3. In this figure, the chain conveyor indicated in its entirety at 36 in itself is of conventional construction and includes transverse flights or paddles 37 for carrying the cotton into the conduit structure. The direction of movement of the cotton by the chain conveyor 36 is generally in the same direction as that of the auger means 23, namely, at an upwardly inclined angle into the separation chamber. In the case of either of the mechanical conveyors 23, 36, all of the cotton stripped from the plants, both ripe cotton and green bolls, is conveyed into the conduit means.

The pneumatic conveyor mechanism 16 includes the separation chamber 21 identified above, below which is an enclosure 38 in which is a blower 39 including a housing 40 having an outlet 41. Adjacent to and leading from the outlet 41 are adjustable grates 42 and 43 each of which is preferably in the form of a plurality of transversely spaced fingers 42' (see FIG. 5) enabling the air to pass therethrough but closely enough spaced to direct the air flowing therebetween and to prevent the passage of the dropping debris or bolls therethrough. The grates 42, 43 converge and are spaced apart at their terminal ends forming an orifice as indicated at 45. The outlet 41 of the blower is directed diagonally upwardly and the air stream sweeps against the concave enclosure transversing the chambers 21. Additionally, the grates 42, 43 while enabling the passage of air through the fingers thereof, have a substantial effect in directing and converging the air, from the orifice 45, at the desired angle and to an effect brought out hereinbelow.

The separation chamber 21 includes an outer wall 48 which includes the wall element 28 mentioned above. The enclosure 38 defines a space 50 leading upwardly past the outlet 41 of the blower 39 and communicating with the separation chamber. The latter extends upwardly into the conduit 18, which at its juncture with the separation chamber, includes a generally vertical portion 54, merging into an elbow 56, and continuing into a generally horizontal portion 58, which terminates at the terminal end or nozzle 20 identified above.

The separation chamber 21 includes a bellied-out portion generally designated 60 having a well element 61 defining a concavity within chamber 21 and which is surved and approaches a circular sweep leading from an uppermost point 62 which for convenience is immediately below the upper end of the shaft 26 of the conveyor means 22, i.e., adjacent the center of the projection of the space encompassing the conveyor means 22. The wall element 61 leads outwardly and downwardly and terminates in a terminal element 63 which slopes downwardly and inwardly to the green boll inlet 50 at a point adjacent the outlet 41 of the blower 39, and thus adjacent the lower end of the upward air stream produced by the blower.

The air stream produced by the blower is directed generally diagonally upwardly, but with a component of decreasing velocities in a direction toward the bellied-out portion 60 (to the left FIGURE 2), impinging on the upper portion of the wall element 61 and then the air stream is redirected diagonally upwardly and over the incoming component as it transverses into the passage 54 against the outer wall 54' of duct 18 and on through the elbow 56 and horizontal portion 58, and out the nozzle 20. The mushrooming effect of the main stream of air against the upper portion of the wall segent 61 causes some air at low velocity to flow downwardly. The grates 42 and 43 are set to direct an offsetting air stream of higher velocity than the flowing downwardly to scour the wall portion 60 from end 63 upwardly to pick up any lint cotton, but would have insufficient velocity to counter the movement of green bolls into the inlet 50.

The relative positional disposition of the grates 42 and 43 and end piece 63 to one another are important; for it has been found through tests that if end piece 63 is eliminated or if the grates 42 and 43 are positioned differently, the above mentioned scouring effect does not take place and lint cotton is undesirably blown into receptable 66.

The conveyor means 22 conveys the cotton, both the lint cotton and green bolls, in a direction that includes both a transverse and upward component of direction, and because of its rapid rate of operation actually throws the cotton into the separation chamber 21, but at an angle which has a substantial component transverse to the upward air stream developed by the blower 39. The lint cotton which is of course of relatively light weight is entrained in the air stream and carried upwardly through the conduit 18, but the heavier green bolls are not so readily caught by the air sream, but they tend to continue across the air stream and in the direction of diminishing air stream velocity into the bellied-out portion 60. A portion of the green bolls fall out of the air main stream and at times some of them strike and rollingly drop, following the curvature of 60 downwardly. Some however glance upwardly and then drop out of the transverse redirected air stream as they progress toward wall 54'. Eventually all of them descend down onto and drop off of the lower terminal lip element 63 of the wall element and through the storage compartment inlet 50 down into a receptacle space 66, which may be of any conformation desired. The grates 42, 43 are arranged to prevent, or substantially so, the dropping of the green bolls into the blower.

The construction provides a gradual and continuous downward progression of the green bolls, minimizing and substantially eliminating the reintroduction of the green bolls into the air stream, thereby providing a substantially greater efficiency of operation. The curvature of the wall element 61 produces a continuous downward progression of the green bolls as distinguished from a turbulent mixing and random movements thereof in dropping out of the air stream and progressing downwardly into the separation space. Both the mechanical conveyor means 22 and the air stream tend to carry or deflect the cotton laterally into the enlargement 60. This is particularly true in connection with the green bolls, the air stream being effective for carrying the line cotton upwardly notwithstanding such lateral carrying or deflecting.

Preferably the curved wall element 61 is in the form of a door hinged at 65 adjacent the top of the separation chamber, and openable for exposing substantially the entire interior of the separation chamber. The door includes the lower terminal element 63, carrying it out of the interior space in opening, and thereby exposing the lower space 50.

The foregoing illustrations and description are based on a harvesting arrangement which includes the receptacle 14 which is in the form of a trailer. The invention is also adapted to a harvester, as indicated in FIGURE 4, which is of the type having a basket 70 mounted thereon. The pneumatic conveying means 16 may be provided with a different delivery conduit 72 instead of the delivery conduit 18 (see also FIGURE 2) leading to the basket 70. As indicated in FIGURE 2, the conduit 72 leaves the separation chamber at a point where the air stream is already established in its upward direction, and does not change the overall effect of the air stream as produced by the blower and separation chamber, but merely deflects the air stream into the basket 70 instead of into the trailer 14.

Practical tests have been made of the operation of the harvester and the velocity of the air stream at different points in the separation chamber have been determined by actual measurement. These velocities are indicated in FIGURE 2, in feet per minute (f.p.m.) from which the various velocities in the separation chamber can be observed, and attention is directed to the lower velocities in the bellied-out portion 60, this relationship producing the conditions whereby the heavier green bolls can drop as explained above. The indication of the different velocities also shows the prevailing relatively higher velocities in the main portion of the air stream for carrying the lighter lint cotton upwardly and to the intended receptacle.

What is claimed is:

1. In a cotton harvester having a picker for harvesting an aggregate including both lint cotton and green bolls, pneumatic separator means for segregating the green bolls from the lint cotton, comprising: a chamber having first and second opposed walls extending upwardly to an upper lint cotton discharge outlet, blower means having a discharge nozzle communicating with said chamber and disposed adjacent said first wall and being oriented to deliver an initial air stream upwardly toward said second wall, conveying means communicating with said chamber for projecting the aggregate from said picker into the initial air stream to be entrained therein, wherein the entrained aggregate is impinged against the second wall to induce separation of the green bolls from the lint cotton, the second wall including air deflecting means within the chamber for deflecting a substantial portion of the initial air stream to produce a return air stream having a diagonally upward direction toward said first wall and into said lint cotton outlet and a vertical velocity component thereof insufficient to propel the green bolls entrained therein through said outlet; and green boll collecting means communicating with said chamber below the initial air stream to conduct downwardly trending green bolls from said chamber for collection.

2. The invention according to claim 1 and said air deflecting means having a concave wall segment defining a bellied out portion of said chamber toward which said initial air stream is directed.

3. The invention according to claim 2 and said concave wall segment having a downwardly sloping lower end portion extending toward said discharge nozzle and terminated therefrom to form a green boll discharge opening of the green boll collecting means.

4. The invention according to claim 3 and said blower discharge nozzle comprising upper and lower elements convergingly extending at an upward inclination into said chamber and differentially terminating in an orifice for controlling the initial air stream, said upper element extending beyond the extent of said lower element to intercept descending green bolls and other debris with reference to said orifice.

5. The invention according to claim 4 and said elements having a perforate planar make up to allow an amount of air to pass therethrough and thereby be self-cleaning.

6. The invention according to claim 5 and said upper and lower discharge nozzle elements cooperatively disposed to control said initial air stream to impinge on said concave wall segment and in addition thereto to direct a substantially horizontal air stream component along the lower end portion to scour upwardly along the concave segment producing a resultant upward movement of air in opposition to a mushrooming effect caused by the impingement of the initial air stream on the second wall.

7. In a cotton harvester having a unit for harvesting an aggregate including both lint cotton and green bolls, pneumatic separator means for separating the green bolls from the lint cotton comprising; a chamber having a pair of opposed upright walls extending upwardly to communicate with a superposed lint cotton discharge opening, means producing a principal air stream within said chamber having a direction transverse thereof from one said wall toward the other wall, conveying means communicating with said chamber for injecting the aggregate from said harvester units into the chamber to be entrained in the principal air stream, air deflecting means disposed within said chamber in impinging relation to the principal air stream and the entrained aggregate to cause the green bolls to lose momentum and drop from the principal air stream, said deflecting means producing a vertical velocity component insufficient to propel green bolls upwardly through said lint cotton discharge opening, and green boll collecting means communicating with the chamber below the principal air stream and providing a green boll outlet from the chamber.

References Cited

UNITED STATES PATENTS

| 404,430   | 6/1889 | Pickett    | 209—137 |
| 2,356,465 | 8/1944 | McKenzie   | 209—136 |
| 2,978,103 | 4/1961 | Cowher     | 209—135 |
| 3,024,907 | 3/1962 | Carruthers | 209—136 |
| 3,312,343 | 4/1967 | Elder      | 209—139 |

FOREIGN PATENTS 41,179   7/1937   Netherlands.

FRANK W. LUTTER, Primary Examiner

U.S. Cl. X.R.

209—139, 147, 153